US009922079B2

(12) United States Patent
Ono et al.

(10) Patent No.: US 9,922,079 B2
(45) Date of Patent: Mar. 20, 2018

(54) INFORMATION PROCESSING APPARATUS, FOR ASSISTING USER IN SETTING AN APPROPRIATE SEARCH CONDITION

(71) Applicant: Sony Corporation, Minato-ku (JP)

(72) Inventors: Satoshi Ono, Kanagawa (JP); Kentaro Hori, Tokyo (JP); Mariko Nagae, Kanagawa (JP)

(73) Assignee: Sony Corporation, Minato-ku (JP)

( * ) Notice: Subject to any disclaimer, the term of this patent is extended or adjusted under 35 U.S.C. 154(b) by 231 days.

(21) Appl. No.: 14/082,316

(22) Filed: Nov. 18, 2013

(65) Prior Publication Data

US 2014/0229466 A1 Aug. 14, 2014

(30) Foreign Application Priority Data

Feb. 12, 2013 (JP) .................................. 2013-024292

(51) Int. Cl.
*G06F 17/30* (2006.01)
*G06Q 10/00* (2012.01)

(52) U.S. Cl.
CPC .. *G06F 17/30424* (2013.01); *G06F 17/30554* (2013.01); *G06Q 10/00* (2013.01)

(58) Field of Classification Search
None
See application file for complete search history.

(56) References Cited

U.S. PATENT DOCUMENTS

| 7,912,187 | B1* | 3/2011 | Mikan | H04L 12/5815 379/88.14 |
| 2005/0240580 | A1* | 10/2005 | Zamir | G06F 17/30867 |
| 2006/0270421 | A1* | 11/2006 | Phillips | G08B 21/0236 455/457 |
| 2008/0005695 | A1* | 1/2008 | Ozzie | G06F 17/30867 715/811 |
| 2009/0083060 | A1* | 3/2009 | Sherman | G06Q 30/06 705/1.1 |
| 2009/0183208 | A1* | 7/2009 | Christensen | H04N 7/17318 725/58 |
| 2009/0327903 | A1* | 12/2009 | Smith | H04L 12/2697 715/737 |
| 2010/0114908 | A1* | 5/2010 | Chand | G06F 17/30864 707/748 |
| 2010/0153428 | A1* | 6/2010 | Schechter | G06F 17/30867 707/768 |
| 2010/0198812 | A1* | 8/2010 | Athsani | G06F 17/30867 707/722 |
| 2011/0119298 | A1* | 5/2011 | Arrasvuori | G06F 17/30867 707/769 |
| 2011/0258301 | A1* | 10/2011 | McCormick | H04L 67/34 709/222 |

(Continued)

FOREIGN PATENT DOCUMENTS

JP 2006-293607 10/2006

*Primary Examiner* — Richard Bowen
(74) *Attorney, Agent, or Firm* — Chip Law Group

(57) ABSTRACT

There is provided an information processing apparatus including a device state detection unit configured to detect a device state of an electronic device, and a search condition setting unit configured to reference a database that stores information regarding the device state in association with a search condition used for a search for operation related information for the electronic device, and to extract the search condition corresponding to the device state.

21 Claims, 10 Drawing Sheets

(56) References Cited

U.S. PATENT DOCUMENTS

| | | | |
|---|---|---|---|
| 2012/0209839 A1* | 8/2012 | Andrews | G06Q 10/10 707/728 |
| 2012/0269116 A1* | 10/2012 | Xing | H04L 67/22 370/328 |
| 2013/0226905 A1* | 8/2013 | Chamberlain | G06Q 10/047 707/722 |
| 2014/0129950 A1* | 5/2014 | Peterson | G06F 17/30554 715/738 |
| 2014/0160148 A1* | 6/2014 | Barkett | G06T 11/60 345/619 |

* cited by examiner

INFORMATION PROCESSING APPARATUS, FOR ASSISTING USER IN SETTING AN APPROPRIATE SEARCH CONDITION

CROSS REFERENCE TO RELATED APPLICATIONS

This application claims the benefit of Japanese Priority Patent Application JP 2013-024292 filed Feb. 12, 2013, the entire contents of which are incorporated herein by reference.

BACKGROUND

The present disclosure relates to an information processing apparatus, an information processing method, and a program.

Since devices have been sophisticated in recent years, more and more information is necessary for users to sufficiently handle the devices. For example, some manuals over several hundred pages describe how to operate devices. In addition, frequently asked questions (FAQ) may also be provided. Since it is difficult to grasp all the information (which will also be referred to as operation related information) in advance, a search system for information is provided. For example, JP 2006-293607A describes a system for parsing an input sentence (such as "unconnectable to the Internet"), extracting keywords (such as "Internet" and "unconnectable"), and using the keywords and the similar keywords to search for information included in manuals and FAQ.

SUMMARY

However, the system described in JP 2006-293607A supposes that an operator in a call center inputs a sentence for keyword extraction. The operator does not grasp all operation related information, but has fundamental knowledge for device operations. Accordingly, for example, even if a user fails to sufficiently explain the situation, the operator can create an appropriate sentence by compensating for the deficiency.

Meanwhile, since more operation related information and search sites provided on the Internet have been in widespread use, users directly search for operation related information more frequently. However, a user does not necessarily have fundamental knowledge for device operations. Accordingly, it is difficult for the user to input an appropriate search condition. In such a case, it is difficult to input an appropriate sentence even if the user uses the system described in JP 2006-293607A. Consequently, a keyword obtained by parsing the sentence is not also appropriate. The user would possibly fail to acquire information that the user is looking for.

The present disclosure therefore proposes a novel and improved information processing apparatus, information processing method, and program that facilitate a user to acquire information that the user is looking for by assisting the user in setting an appropriate search condition.

According to an embodiment of the present disclosure, there is provided an information processing apparatus including a device state detection unit configured to detect a device state of an electronic device, and a search condition setting unit configured to reference a database that stores information regarding the device state in association with a search condition used for a search for operation related information for the electronic device, and to extract the search condition corresponding to the device state.

According to another embodiment of the present disclosure, there is provided an information processing method including detecting a device state of an electronic device, and referencing a database that stores information regarding the device state in association with a search condition used for a search for operation related information for the electronic device, and extracting the search condition corresponding to the device state.

According to still another embodiment of the present disclosure, there is provided a program for causing a computer to realize the functions of detecting a device state of an electronic device, and referencing a database that stores information regarding the device state in association with a search condition used for a search for operation related information for the electronic device, and extracting the search condition corresponding to the device state.

According to the embodiments, when operation related information for an electronic device is searched for, a database will be referenced that stores information regarding a device state of the electronic device in association with the operation related information. Thus, it is possible to set a more appropriate search condition for a search for information that has the device state of the electronic device reflected therein and is looked for by a user.

According to one or more of embodiments of the present disclosure, it is possible to facilitate a user to acquire information that the user is looking for by assisting the user in setting an appropriate search condition.

DETAILED DESCRIPTION OF THE EMBODIMENT(S)

Figure 1:
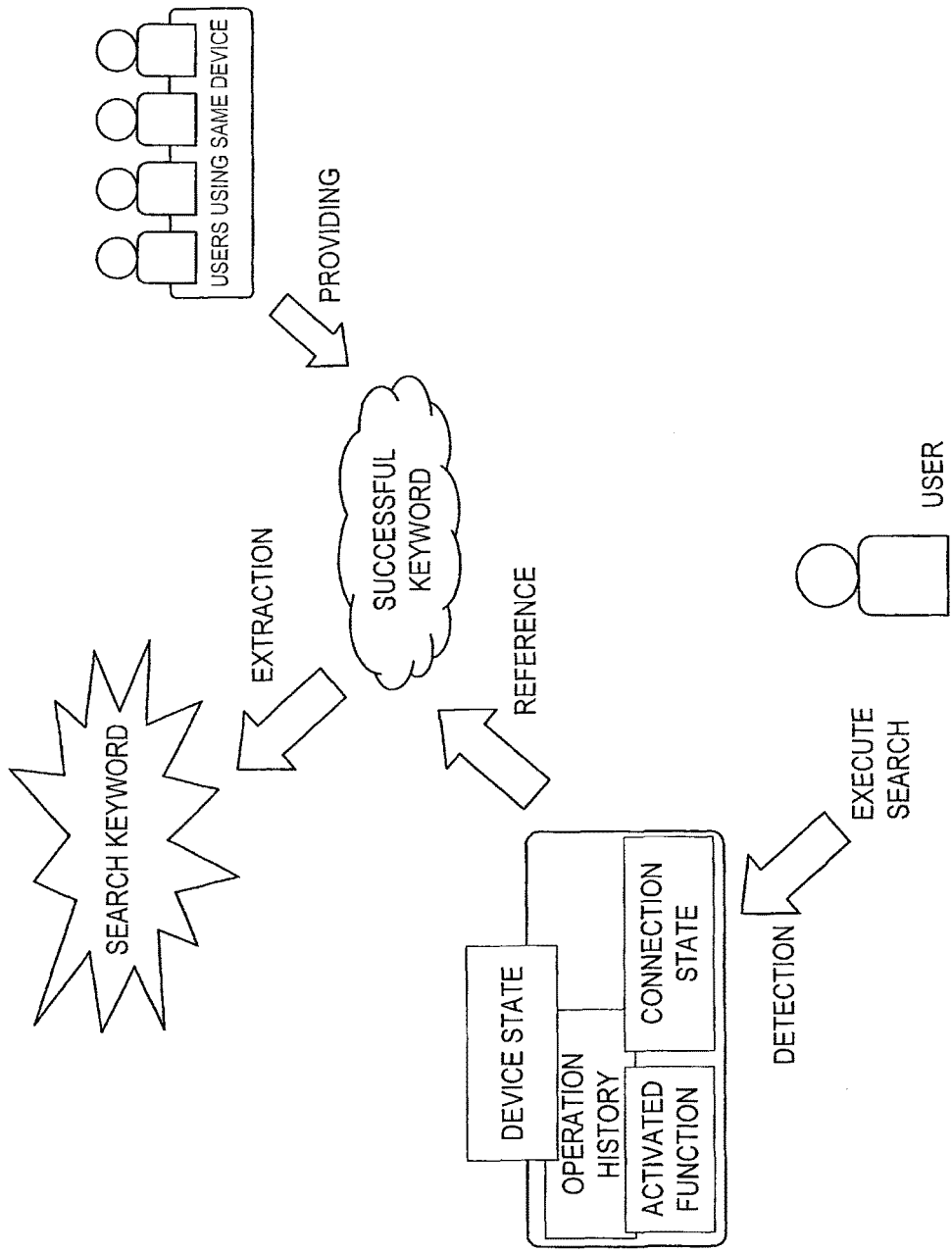
FIG. 1 is a diagram for describing an overview of a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First Embodiment
   1-1. Overview
   1-2. Functional Configuration
   1-3. Process Flow
   1-4. Examples of Search Results
   1-5. Conclusion
2. Second Embodiment
3. Third Embodiment
4. Fourth Embodiment
5. Hardware Configuration
6. Supplement

1. First Embodiment (1-1. Overview)

FIG. 1 is a diagram for describing an overview of a first embodiment of the present disclosure. As illustrated, a device state is detected in the present embodiment when a user of an electronic device searches for operation related information. The device state includes, for example, a connection state to a network, an activated function, and an operation history of a device. Such information regarding the device state is used for a reference to a keyword (a so-called successful keyword) that is provided on the basis of previous search results of users who use the same device and is supposed to be associated with useful information. For example, a function that a user currently attempts to cause a device to realize may be estimated by combining multiple pieces of information indicating device states with one another, and a "successful keyword" corresponding to the function may be extracted. The user can acquire information more similar to information that the user desires by using the extracted keyword as a search keyword to execute a search.

Here, the "successful keyword" in the illustrated example will be further described. The "successful keyword" can also be referred to as collective knowledge including search results of users who use the same device, for example, in the same state or in confrontation with the same problem. For example, when, after a search result is acquired, information (such as a Web page) indicated by the search result is accessed much, when another search is not thereafter executed with another keyword (since the search has succeeded, it is estimated that a further search is not necessary), or when an operation log clarifies that the operation proceeds to the next step because the problem that occurred upon the search has been solved, the keyword used for the search may be determined as a "successful keyword."

Additionally, the "successful keyword" as the collective knowledge such as the above-described examples includes search results of quite a lot of users. Thus, some keyword may be provided in substitution for the "successful keyword" if there are not enough search results of users. For example, a search condition of search keywords combined by using an AND condition and an OR condition, which are rarely used by search beginners, may be provided in substation for the "successful keyword." The combined search keywords may also be keywords that have been used for previous searches by other users, or keywords that have been used more frequently among them.

The operation related information means herein information necessary when a user operates an electronic device 100 to realize some function. The operation related information includes, for example, information that describes a way of operating the electronic device 100, connection setting necessary prior to the operation, and an operation in a connected external device to a user. In recent years, there has been a lot of operation related information, for example, ubiquitously on the Internet: user sites in which users publish procedures for operating a device found by the users, Q&A sites in which users answer other users' questions, and bulletin board systems (BBS) in which the usability of a device is discussed in addition to official manuals and FAQ provided by suppliers of devices. Such unofficial operation related information is not organized in most cases like the official manuals and the FAQ. Consequently, users of a device execute searches chiefly with some search method such as search sites to find the above-mentioned information. Conversely, if users fail to find such information with some search method, such operation related information is not provided to the users.

However, it is not easy for a user who uses a device to appropriately recognize a search condition such as a keyword for acquisition of the operation related information. For example, a function of the same device may have multiple names. As a specific example, a function of recording a broadcast program, which has been recorded by some recorder, on another medium or apparatus is referred to as "dubbing" in the manual, while a part of users refers to the function as "copy." In this case, if a search is executed with the keyword "copy," official operation related information associated with the keyword "dubbing" may not be acquired. To the contrary, if a majority of the users actually refers to the function as "copy," useful information may be associated with the keyword "copy" among the unofficial operation related information on the Internet. It is difficult for users who have trouble in handling a device and attempt to execute searches to know such a situation in advance.

Accordingly, as illustrated in FIG. 1, a user's situation is estimated from a device state, and as a keyword for a search for operation related information according to the situation, a keyword useful when another user has searched for operation related information in the similar situation is extracted and used in the present embodiment. As a result, the user does not have to recognize the situation nor determine a keyword. It is also possible to estimate, from a search result of another user, what keyword brings an appropriate search result in the situation.

(1-2. Functional Configuration)

Figure 2:
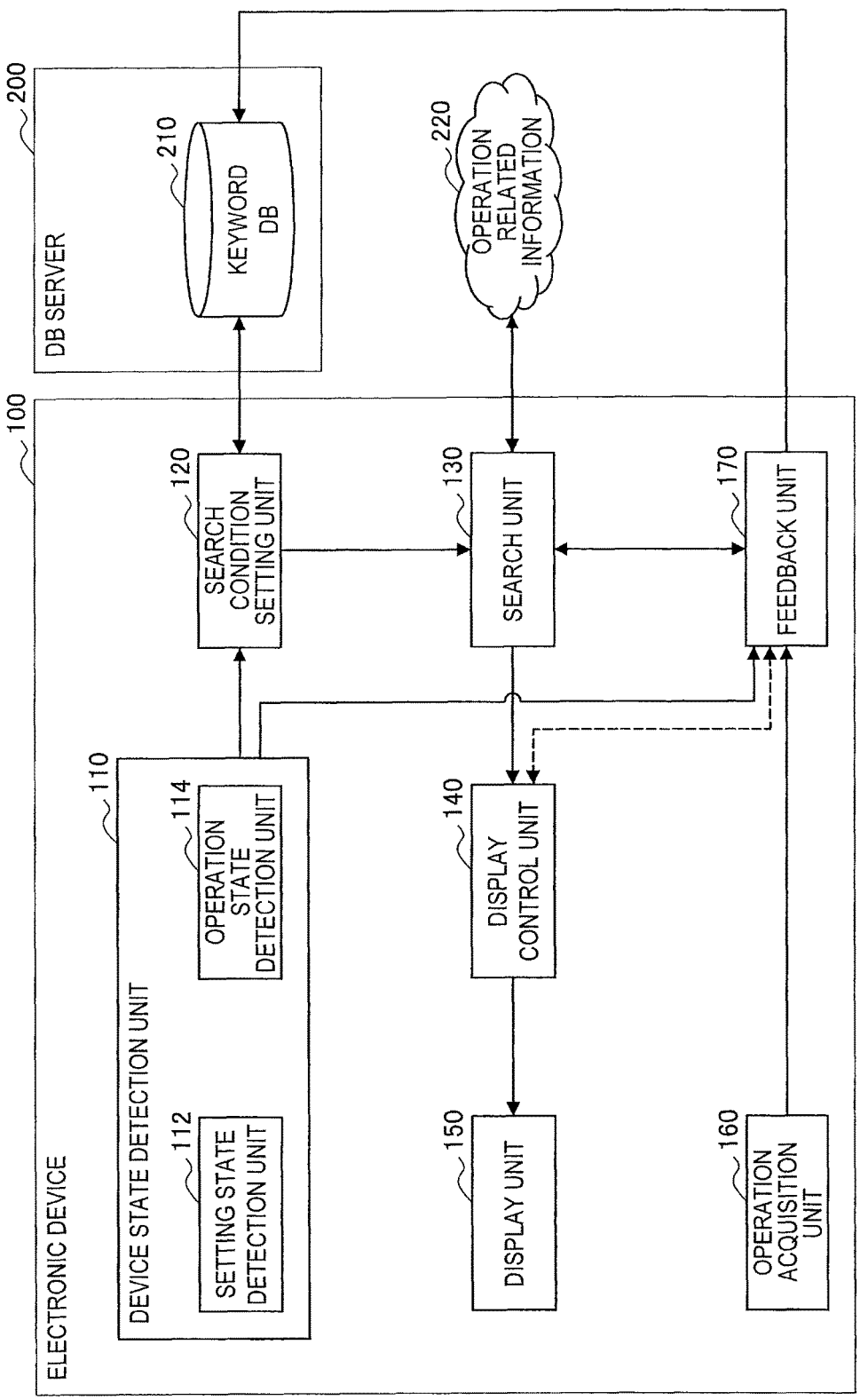
FIG. 2 is a block diagram for schematically illustrating a functional configuration according to the first embodiment of the present disclosure.

FIG. 2 is a block diagram schematically illustrating a functional configuration according to the first embodiment of the present disclosure. With reference to FIG. 2, an electronic device 100 according to the present embodiment includes a device state detection unit 110, a search condition setting unit 120, a search unit 130, a display control unit 140, a display unit 150, an operation acquisition unit 160, and a feedback unit 170. The electronic device 100 may include various devices each capable of providing a predetermined function in response to a user operation, and acquiring operation related information through access to a network. For example, the electronic device 100 may be an information terminal such as a personal computer (PC) and a mobile phone (smartphone). In this case, the "predetermined function" may be a function that is provided, for example, by an application installed in the PC. The electronic device 100 may also be a home-use electrical appliance such as a television, a recorder, a game console, and a digital camera that has a network communication function.

As described below, the electronic device 100 references a keyword DB 210 included in a DB server 200 via a network. The DB server 200 is realized by a single or multiple server apparatuses on the network.

Additionally, the figure illustrates at least one of the functional configurations of the electronic device 100 and the DB server 200 that is relative to the present embodiment. Such a functional configuration may be realized, for example, by a hardware configuration of an information processing apparatus, which will be described below. The electronic device 100 and the DB server 200 may each include a functional configuration for realizing the device original function such as a conversation function of a mobile phone and a broadcast content display function of a television in addition to the illustrated structural elements. However, since the functional configuration has been already known well to those skilled in the art, the detailed description will be omitted here.

A configuration of each unit in the electronic device 100 will be further described below. A processor such as a CPU may operate in accordance with a program to realize each unit other than the display unit 150 and the operation acquisition unit 160 like software.

The device state detection unit 110 includes at least one of a setting state detection unit 112 and an operation state detection unit 114, and detects a device state of the electronic device 100. The setting state detection unit 112 detects a setting state of the electronic device 100 such as a format of the electronic device 100, an external device connected to the electronic device 100, and network connection setting of the electronic device 100, which does not change unless an operation is intentionally performed for changing the setting. Meanwhile, the operation state detection unit 114 detects an operation state of the electronic device 100 such as a use history of the electronic device 100, a used storage capacity of a storage unit including a HDD in the electronic device 100, a function activated in the electronic device 100, the latest operation history of the electronic device 100, which is changed as necessary by a usual user operation. Additionally, since the techniques for detecting the setting state and the operation state of the electronic device 100 have been already known well to those skilled in the art, the detailed description will be omitted here.

The search condition setting unit 120 sets a search condition for a search for operation related information for the electronic device 100, on the basis of a device state detected by the device state detection unit 110. Additionally, the search condition setting unit 120 sets a search keyword as a search condition in the present embodiment. When setting a search condition, the search condition setting unit 120 references the keyword DB 210 and extracts a search condition corresponding to the detected device state. For example, the keyword DB 210 stores a device state in association with a search keyword, and a "successful keyword" used in a previous search executed by another user, who uses the same type of electronic device as the electronic device 100, is stored in association with a device state at the time of the search. That is, a search keyword stored in the keyword DB 210 may have been used by another user in a certain device state for a search, and the search result may have been thereafter regarded as being useful by an explicit or implicit feedback from the other user.

Alternatively, the search condition setting unit 120 may estimate a function of the electronic device 100, which is desired by a user, on the basis of a device state detected by the device state detection unit 110, and set a search condition for a search for operation related information on the basis of the estimated function. In this case, the keyword DB 210 may store the function of the electronic device 100 in association with a search keyword. A keyword stored in the keyword DB 210 may be used for a search when another user desires a certain function, and the search result may have been thereafter regarded as being useful by an explicit or implicit feedback from the other user.

Here, a search condition that is set by the search condition setting unit 120 may be a single or multiple keywords, or a single or multiple keywords combined by a conditional expression such as an AND conditional expression, an OR conditional expression, and a NOT conditional expression. That is, a search condition that is set by the search condition setting unit 120 may be a keyword in itself, or a part or a whole of a search query including the search keyword.

The search unit 130 searches for operation related information in accordance with a search condition that is set by the search condition setting unit 120 to acquire the search result. A search target of the search unit 130 is operation related information 220 on a network in the present embodiment. The search may be, for example, a Web search. When a search condition provided from the search condition setting unit 120 is a search keyword or a part of a search query, the search unit 130 assembles the search query with such information and executes a search. Alternatively, when a search condition provided from the search condition setting unit 120 is a whole of a search query, the search unit 130 executes a search with the search condition used as a search query. The search unit 130 provides a result of the search for the operation related information 220 to the display control unit 140. The search unit 130 may also provide the search result of the operation related information 220 to the feedback unit 170.

Here, a search executed by the search unit 130 may be triggered by an operation input of a user, or automatically started when the search condition setting unit 120 sets a search condition. In the former case, the device state detection unit 110 automatically and repeatedly detects a device state and the search condition setting unit 120 automatically and repeatedly sets a search condition. When the operation input of the user issues an instruction for a search for operation related information, a search condition that is set at the time of issuing the instruction may be used to execute the search. In the latter case, when the operation input of the user issues an instruction for a search for operation related information, the device state detection unit 110 starts to detect a device state and the search condition setting unit 120 starts to set a search condition. After a search condition is set, a search may be executed. First of all, the search condition such as a search keyword, which is set by the search condition setting unit 120, may be provided to the display control unit 140, and thereafter, the search condition may be used for the search executed by the search unit 130 through confirmation and modification of the user.

The display control unit 140 causes the display unit 150 to display a search result of the operation related information 220, which is acquired by the search unit 130. The display control unit 140 may also edit the search result and cause the display unit 150 to display the search result on a list. The display control unit 140 may set whether to display the operation related information (displayed/hidden) on the list, or may set sort order, on the basis of feedback information for a previous search result. The feedback information will be described below. It may be set for each operation related information group whether to display operation related information, or the sort order. The operation related information group may be set, for example, on the basis of whether the operation related information is official or unofficial. Alternatively, the operation related information group may also be set, for example, on the basis of types of operation related information such as manuals, FAQ, user sites, Q&A sites, and BBS. Furthermore, the operation related information group may be more specifically set for a user site of a specific user, a specific Q&A site, or specific BBS.

The display unit 150 is realized by various displays each of which is included in the electronic device 100 as an output apparatus. The display unit 150 displays a search result of the operation related information 220, which is acquired by the search unit 130, under the control of the display control unit 140. Additionally, if the electronic device 100 is a device such as a desktop PC, a recorder, and a game console that does not include a display, a display unit may be connected to the electronic device 100 as an external apparatus (such as a monitor and a television). In this case, the electronic device 100 includes the display control unit 140, but does not include the display unit 150.

A search result is displayed by the display control unit 140 and the display unit 150 as an image in the present embodiment. However, a way of outputting a search result is not limited to the example. For example, in addition to or in substitution for image display, a search result may also be output as a sound in another embodiment.

The operation acquisition unit 160 is realized by a touch panel, a push button, or a mouse that is included in the electronic device 100 as an input apparatus. The operation acquisition unit 160 may acquire all the types of operation inputs of a user to the electronic device 100. The operation acquisition unit 160 acquires an operation input to the electronic device 100, which is made after the display unit 150 displays a search result, in the present embodiment. More specifically, an operation input acquired by the operation acquisition unit 160 may be an operation that, for example, a user selects any of search results displayed on a list on the display unit 150 and causes the detailed operation related information to be displayed. An operation input acquired by the operation acquisition unit 160 may also be an operation input regarding the original function of the electronic device 100, which is, for example, the next function performed by a user who has referenced operation related information. Such an operation input is not only used for reference to operation related information or the original function of the electronic device 100, but may also be provided to the feedback unit 170.

The feedback unit 170 generates feedback information for a search condition extracted by the search condition setting unit 120, on the basis of an operation input of a user, which is acquired by the operation acquisition unit 160, a device state, which is detected by the device state detection unit 110, and/or a search result the operation related information 220, which is acquired by the search unit 130, and provides the feedback information to the DB server 200 along with a device state or a function of the electronic device 100, which is used for setting the search condition. For example, the DB server 200 evaluates a search keyword stored in the keyword DB 210 on the basis of the provided feedback information, and stores, as a "successful keyword," a search keyword having a positive feedback that exceeds a predetermined criterion. If a search keyword that is not stored in the keyword DB 210 is provided along with a positive feedback, the search keyword may be added to the keyword DB 210.

For example, the feedback unit 170 may confirm with respect to operation related information included in a search result, which is acquired by the search unit 130, whether a user has displayed the detailed operation related information, and furthermore, how long the detailed operation related information has been referenced, from an operation input of the user, which is acquired by the operation acquisition unit 160, and may generate feedback information on the basis thereof. In this case, if the detailed operation related information is displayed with respect to more search results or the detailed operation related information is referenced for a longer time, the search results are estimated to be useful for a user. Accordingly, the feedback unit 170 may generate positive feedback information for a search condition extracted by the search condition setting unit 120. To the contrary, if the detailed operation related information is displayed with respect to fewer search results or the detailed operation related information is referenced for a shorter time, the search results are estimated to be less useful for a user. Accordingly, the feedback unit 170 may generate negative feedback information for a search condition used by the search unit 130.

For example, after the feedback unit 170 references operation related information included in a search result, which is acquired by the search unit 130, the feedback unit 170 may generate a feedback on the basis of what operation input is provided from a user to the operation acquisition unit 160. In this case, if an operation input (for example, an operation input unit for executing dubbing if operation related information regarding "dubbing" is searched for) according to the operation related information included in the search result is provided, a user references the operation related information to estimate that a desired function of the electronic device 100 can be realized. Accordingly, a positive feedback may be generated for a search condition used by the search unit 130. To the contrary, if an operation input corresponding to the operation related information included in the search result is not provided, it is estimated that a user references the operation related information, but fails to realize a desired function of the electronic device 100. Accordingly, a negative feedback may be generated for the search condition used by the search unit 130. In addition to or in substitution for an operation input of a user, which is acquired by the operation acquisition unit 160, it is recognized that a function of the electronic device 100 is realized on the basis of a device state after a search result, which is detected by the device state detection unit 110, is displayed, so that a feedback can be similarly generated.

Furthermore, the feedback unit 170 may also generate feedback information for a search result in the same way as a search condition. In this case, the generated feedback may be provided to the search unit 130. For example, the search unit 130 accumulates pieces of feedback information for each operation related information group, and reflects the accumulated feedback information in the next or later search result. The operation related information group may be the same as described for the display control unit 140. For example, if positive feedbacks for operation related information in some Q&A site are accumulated, the search unit 130 may preferentially include the operation related information in the Q&A site into a search result. Alternatively, the feedbacks for the operation related information included in the search result may be provided to the display control unit 140. In this case, the display control unit 140 may accumulate results of the feedbacks for each operation related information group, and display operation related information for a group that has positive feedbacks accumulated therefor in an upper position in the search result.

For example, a feedback is generally transmitted to a provider of operation related information with respect to organized operation related information such as an official manual and FAQ. To the contrary, mechanisms for transmitting and reflecting a feedback are not established in most cases with respect to feedbacks for an unofficial user site and BBS. The search unit 130 or the display control unit 140 is therefore provided with feedback information so that a feedback acquired from a previous search can be reflected in a new search result at the time of executing the search or displaying the search result.

(1-3. Process Flow)

Figure 3:
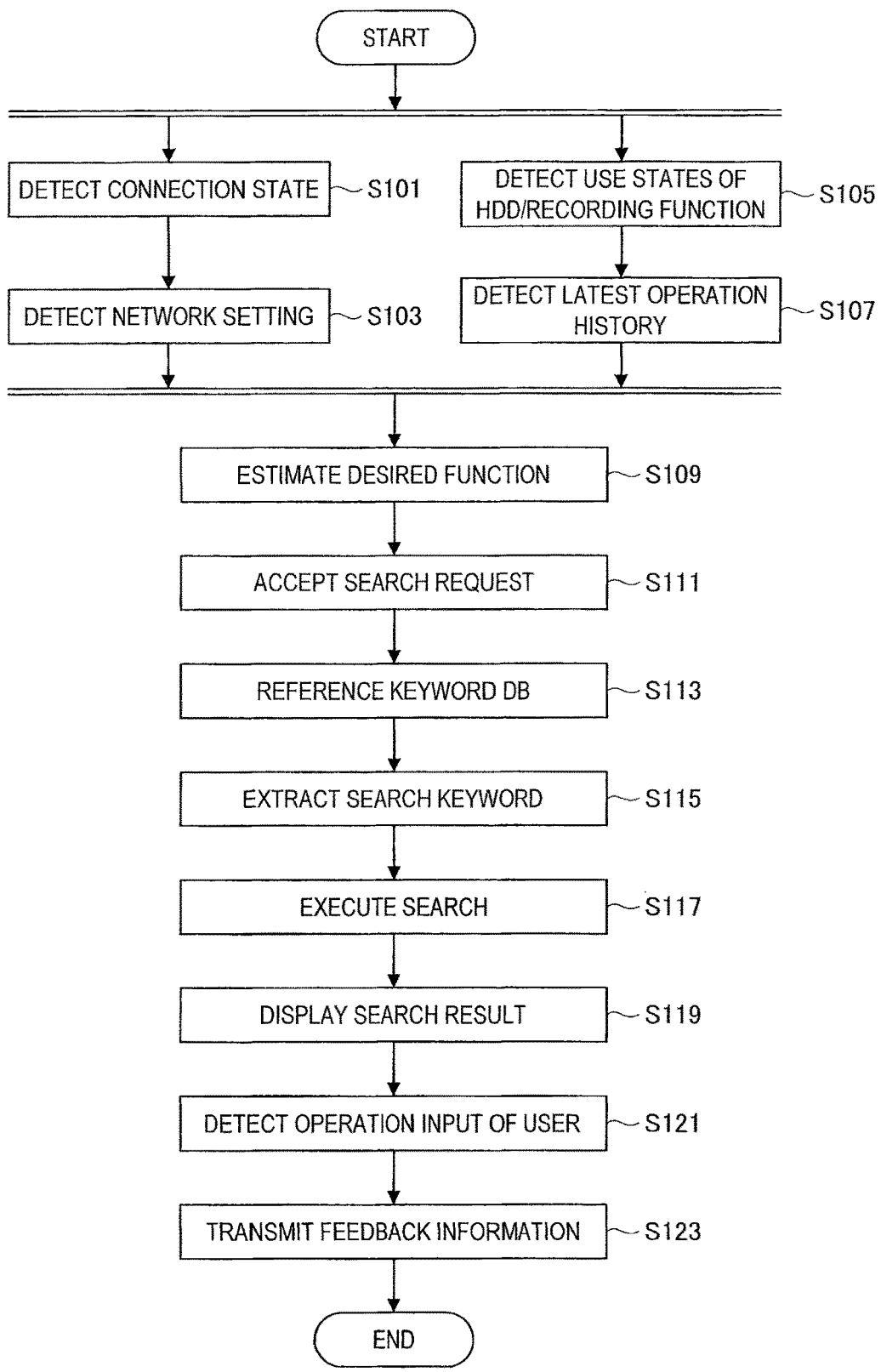
FIG. 3 is a flowchart illustrating an example of a process according to the first embodiment of the present disclosure.

FIG. 3 is a flowchart illustrating an example of a process according to the first embodiment of the present disclosure. For convenience of explanation for the present technology, a specific example will be described herein in which the electronic device 100 according to the present embodiment is a recorder. In the following example, the device state detection unit 110 automatically detects a device state and the search condition setting unit 120 automatically sets a search condition. In addition, if an operation input of a user issues an instruction for a search for operation related information, a search condition that is set at the time of issuing the instruction is used to execute a search. As described above, the embodiments of the present disclosure are not limited to such an example. A device state, a search condition, and a search may be detected, set, and executed in any given order, respectively.

Once a process starts, the device state detection unit 110 detects a device state of the electronic device 100. The setting state detection unit 112 detects a connection state of the electronic device 100 (step S101), and detects network setting of the electronic device 100 (step S103) in the illustrated example. Upon detection of the connection state, a cable (such as an HDMI cable) connected to the electronic device 100 may be, for example, detected, and an external device (such as a television) connected to the cable may also be detected. Upon detection of the network setting, it may be detected, for example, whether various networks (such as the Internet, Wi-Fi, and Bluetooth (registered trademark)) settable in the electronic device 100 are set to be available.

Meanwhile, the operation state detection unit 114 detects use states of an HDD and a recording function (step S105), and detects the latest operation history (step S107). Upon detection of the use states of the HDD and the recording function, it may be detected, for example, that 80 GB of a used storage capacity 500 GB in the HDD is used, the electronic device 100 is used for 25 days of elapsed time 50 days since the electronic device 100 has been purchased, an automatic recording function is chiefly used and a keyword "detective drama" is used upon automatic recording, only some pieces of the recorded content are reproduced, the reproduced content is not dubbed or deleted, the content is frequently reproduced on Saturday evening, and the like. Additionally, steps S101 to S107 are not necessarily performed in the illustrated order, but may be performed in optionally changed order.

The search condition setting unit 120 does not use information regarding a device state to reference the keyword DB, but estimates a function of the electronic device 100 that a user desires on the basis of the device state and uses information regarding the estimated function to reference the keyword DB in the illustrated example. Accordingly, when a device state of the electronic device 100 is detected in steps S101 to S107, the search condition setting unit 120 estimates a desired function of the electronic device 100 on the basis of the device state (step S109). For example, the latest operation history detected in step S107 shows that a user hesitates over selection of menus and functions that have not been usually selected, it is estimated that the user desires a new function that the user has not experienced before. Thus, a function that has been already realized by the user is excluded as a candidate for a desired function. In addition, when the use state of the HDD detected in step S105 shows that the HDD still has a vacant storage capacity, it is estimated that a desired function is not a function of deleting the recorded content. As a result of the estimation, it is estimated in the illustrated example that a desired function is "dubbing the recorded content on a recording medium such as a Blu-ray Disc (BD)."

Next, a search request is accepted (step S111). For example, the search request may be accepted through an explicit operation input of a user. For example, the explicit operation input of a user may be acquired through an operation for displaying a help or activation of a browser for a search. Alternatively, the search request may also be automatically accepted. For example, when the latest operation history shows that the user hesitates over selection of menus and functions that have not been usually selected, the electronic device 100 may have functions of automatically searching for and displaying operation related information.

When the search request is accepted, the search condition setting unit 120 references the keyword DB 210 on the basis of the function estimated in step S109 (step S113), and extracts a search keyword from the keyword DB 210 (step S115). As described above, the keyword DB 210 stores a function of the electronic device 100 in association with a search keyword. The search condition setting unit 120 extracts, from the keyword DB 210, a search keyword associated with the function of "dubbing the recorded content on a recording medium such as a BD." Additionally, each function is not necessarily recorded as a sentence such as described above in the keyword DB, but may also be recorded in the form of an abstracted code, for example.

Let us assume here that search keywords "copy," "application," and "activation" are extracted from the keyword DB 210 in step S115 of the illustrated example. The keywords are not included in the definition of the function of "dubbing the recorded content on a recording medium such as a BD." However, since a search keyword stored in the keyword DB 210 is a "successful keyword," it is estimated that a search with the above-mentioned search keywords, which are not included in the definition of the function, may bring a more useful result in this case. For example, if a majority of users actually refers to "dubbing" as "copy" and most pieces of the useful information are published by those users, the above-mentioned situation may be the case.

Next, the search unit 130 executes a search with the keywords extracted in step S115 (step S117). The search may be, for example, a Web search. The search unit 130 comprehensively searches for the operation related information 220 such as an official manual, FAQ, an unofficial user site, a Q&A site, and BBS. The search unit 130 outputs the search result to the display control unit 140. The search result may also be output for each type of operation related information, or multiple types of operation related information may be output at once.

Next, the display control unit 140 causes the display unit 150 to display the search result for operation related information, which is provided from the search unit 130 (step S119). For example, the display control unit 140 displays the search result on a list. In this case, the display control unit 140 may display the search result on the list without any change, or may also display the search result after editing whether to display each type of operation related information on the list, or sort order, on the basis of predefined setting or a user operation performed when the result is displayed. Additionally, display examples of the search results will be described below.

Thereafter, the operation acquisition unit 160 acquires an operation input of a user to the search result, which is displayed on the display unit 150 (step S121). The operation input to be acquired here may be, for example, an operation for further reference to the operation related information, which is performed through selection of the operation related information displayed on the list and the like. The operation acquisition unit 160 may acquire an operation regarding the original function of the electronic device 100, which has been executed by the user after the user references the search result.

Next, the feedback unit 170 transmits feedback information for the search keywords, which are set in step S115 (step S123). As described above, the feedbacks are generated on the basis of the operation input of the user, which is acquired by the operation acquisition unit 160, the device state, which is detected by the device state detection unit 110, and/or the search result of the operation related information 200, which is acquired by the search unit 130, and transmitted along with the device state used for setting the search condition or the function of the electronic device 100.

(1-4. Examples of Search Results)

Figure 4:
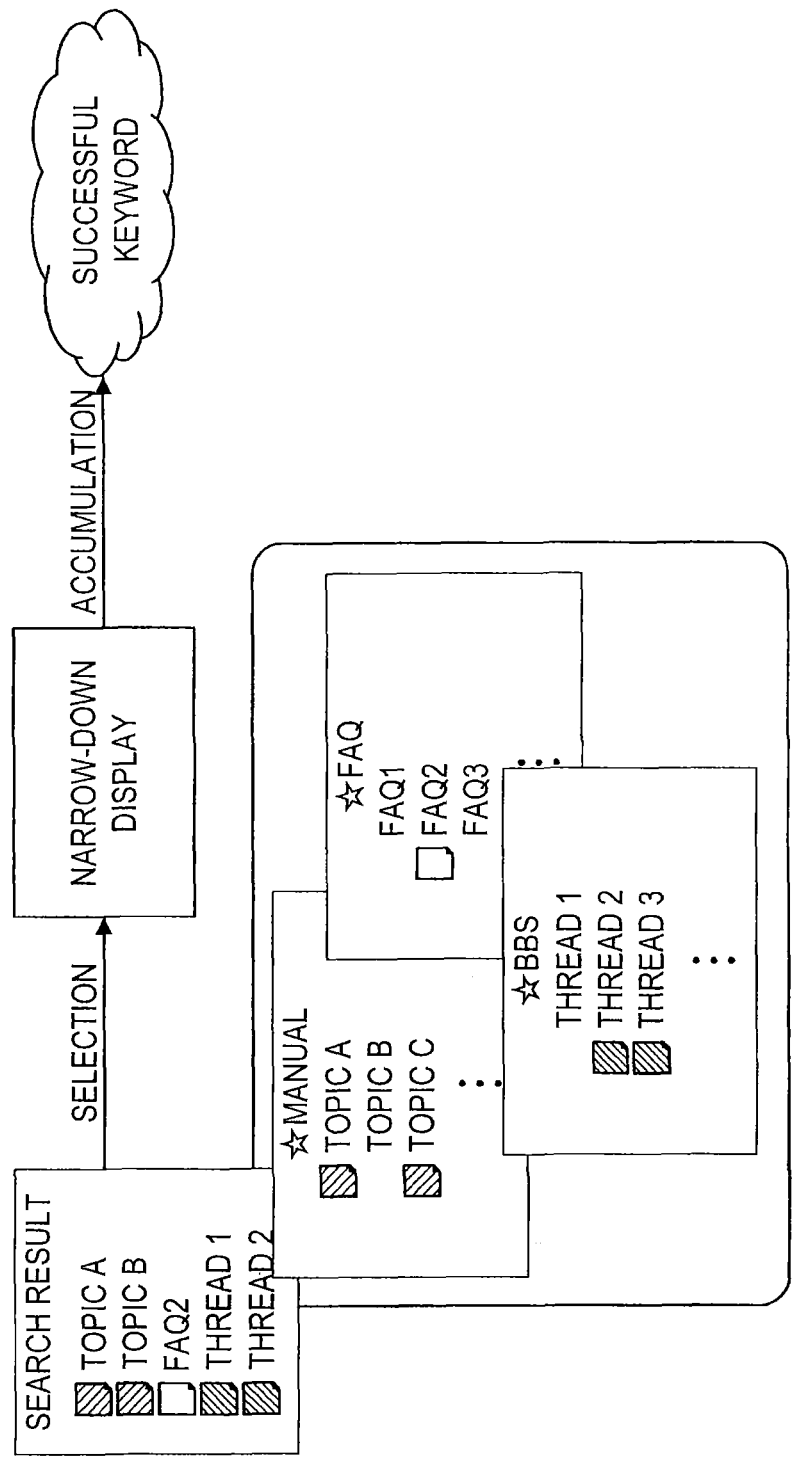
FIG. 4 is a diagram for schematically describing a search result according to the first embodiment of the present disclosure.

FIG. 4 is a diagram for schematically describing a search result according to the first embodiment of the present disclosure. The search result is extracted from multiple types of operation related information such as a manual, FAQ, and BBS. The search result is extracted from a manual (topic A and topic C), FAQ (FAQ 2), and BBS (thread 2 and thread 3) in the illustrated example. The display control unit 140 selects a single or multiple pieces of operation related information included in the search result, and performs narrow-down display on the selected operation related information on the basis of, for example, predefined setting or a user operation in the present embodiment. Here, it may be set herein what operation related information is subjected to narrow-down display, on the basis of feedback information for a previous search result, for example. As new feedback information for the search keyword and the search result, the search unit 130 and the DB server 200 may be provided with information indicating what operation related information has been subjected to narrow-down display through a user operation.

Figure 5:
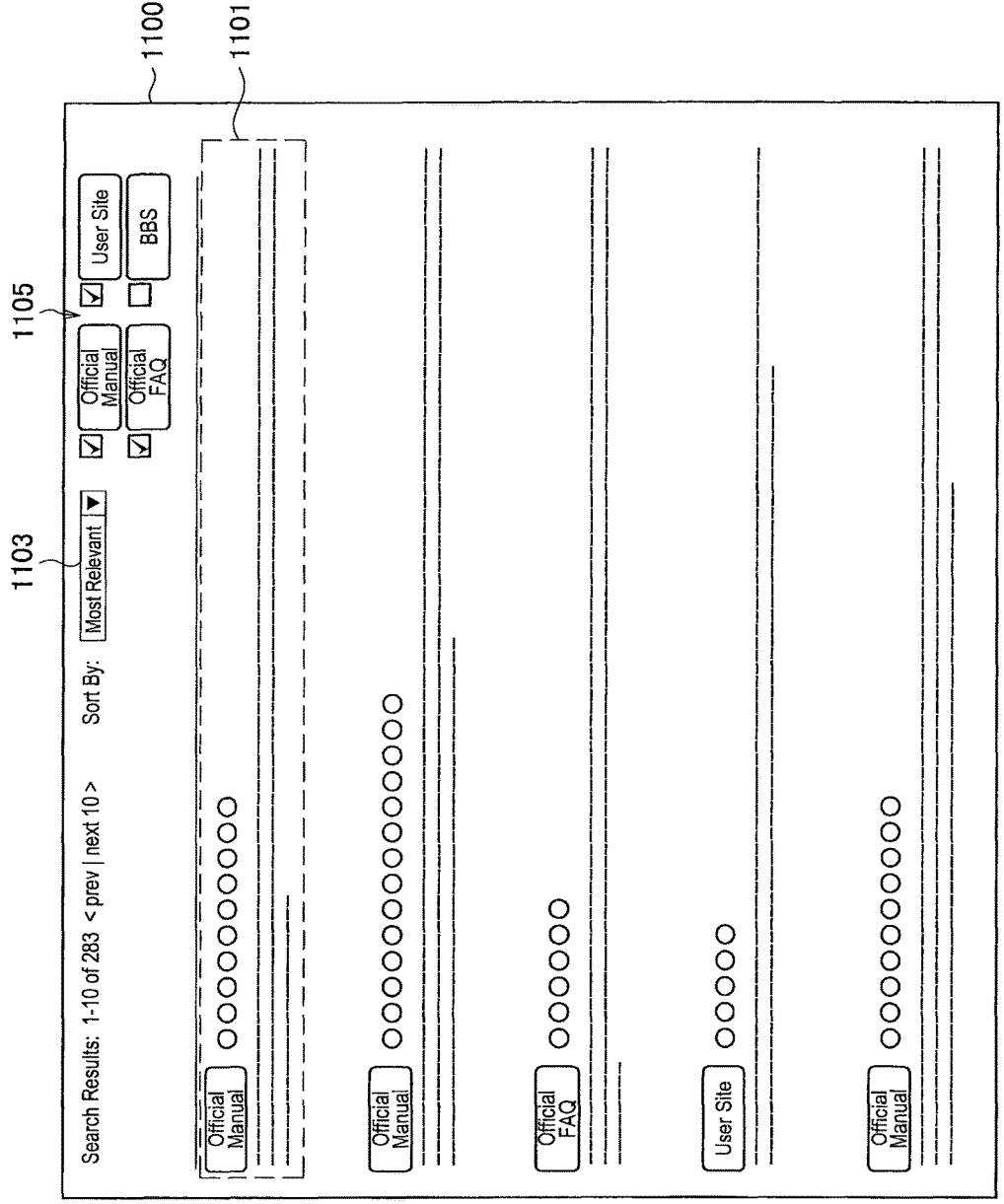
FIG. 5 is a diagram illustrating a display example of a search result according to the first embodiment of the present disclosure.
Figure 6:
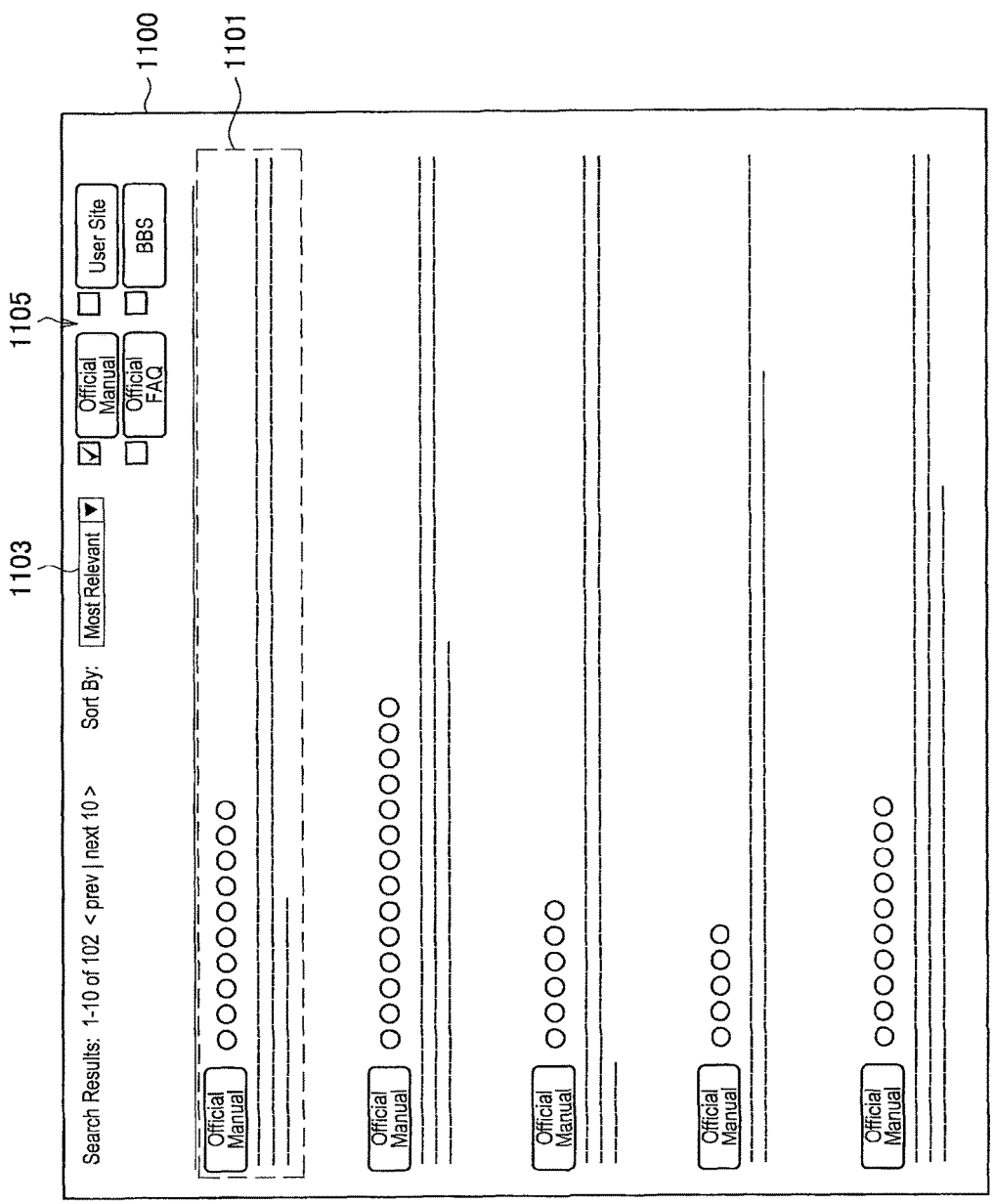
FIG. 6 is a diagram illustrating a display example of the search result according to the first embodiment of the present disclosure.

FIGS. 5 and 6 are diagrams illustrating display examples of a search result according to the first embodiment of the present disclosure. In the illustrated example of FIG. 5, a display screen 1100 displays operation related information of an official manual (Official Manual), official FAQ (Official FAQ), and an unofficial user site (User Site) as a search result. For example, the operation related information is displayed with a title that has an icon representing a type of operation related information and a list 1101 including a part of the contents. For example, when a user selects a region of the list 1101, the user can reference the detailed operation related information by shifting a browser to a Web page.

The pieces of operation related information included in the search result are arranged in descending order of relevance to a search keyword (Most Relevant) in the illustrated example. Sort order of the operation related information may be determined on the basis of, for example, predefined setting or a user operation performed when the result is displayed. For example, the pieces of operation related information included in the search result may be resorted through an operation to a select box 1103 displayed on the display screen 1100 in alphabetical order of the titles or resorted for each type of operation related information. Sort order displayed when the display screen 1100 is first displayed after the search may be set on the basis of feedback information for a previous search result, which is provided from the feedback unit 170 to the search unit 130 or the display control unit 140.

It may also be determined, through, for example, predefined setting or a user operation performed when the result is displayed, whether to display the operation related information (displayed/hidden). For example, operations to check boxes 1105 displayed on the display screen 1100 switch the pieces of operation related information included in the search result to be displayed/hidden for each type of operation related information. Since only BBS are set to be hidden in the illustrated example of FIG. 5, the other three types of operation related information are displayed. To the contrary, since only an official manual (Official Manual) is set to be displayed in the illustrated example of FIG. 6, operation related information limited to this type is displayed. It may be set whether to display the operation related information when the display screen 1100 is first displayed after the search, on the basis of feedback information for a previous search result, which is provided from the feedback unit 170 to the search unit 130 or the display control unit 140. In this case, for example, if the display screen 1100 illustrated in FIG. 5 is first displayed, it is estimated that the feedback information for the previous search result shows that the operation related information obtained by searching the BBS is not very useful for a user.

(1-5. Conclusion)

When operation related information for an electronic device is searched for, a search condition associated with a device state is automatically set in the above-described first embodiment so that appropriate operation related information is acquired more easily through the search. If a database generated on the basis of a search result of another user who uses the same device is referenced, a more appropriate search condition can be set that is based on pieces of operation related information ubiquitously present on a network. In addition, feedback information for a search condition is generated on the basis of an operation input of a user who has referenced a search result and a change in a device state of the electronic device, which has output the search result. As a result, accuracy of a database referenced when the search condition is set can be enhanced. Since the feedback information for the search result is also generated in the same way, information regarding a type of operation related information that has been useful for a previous search can be reflected in a new search.

2. Second Embodiment

Figure 7:
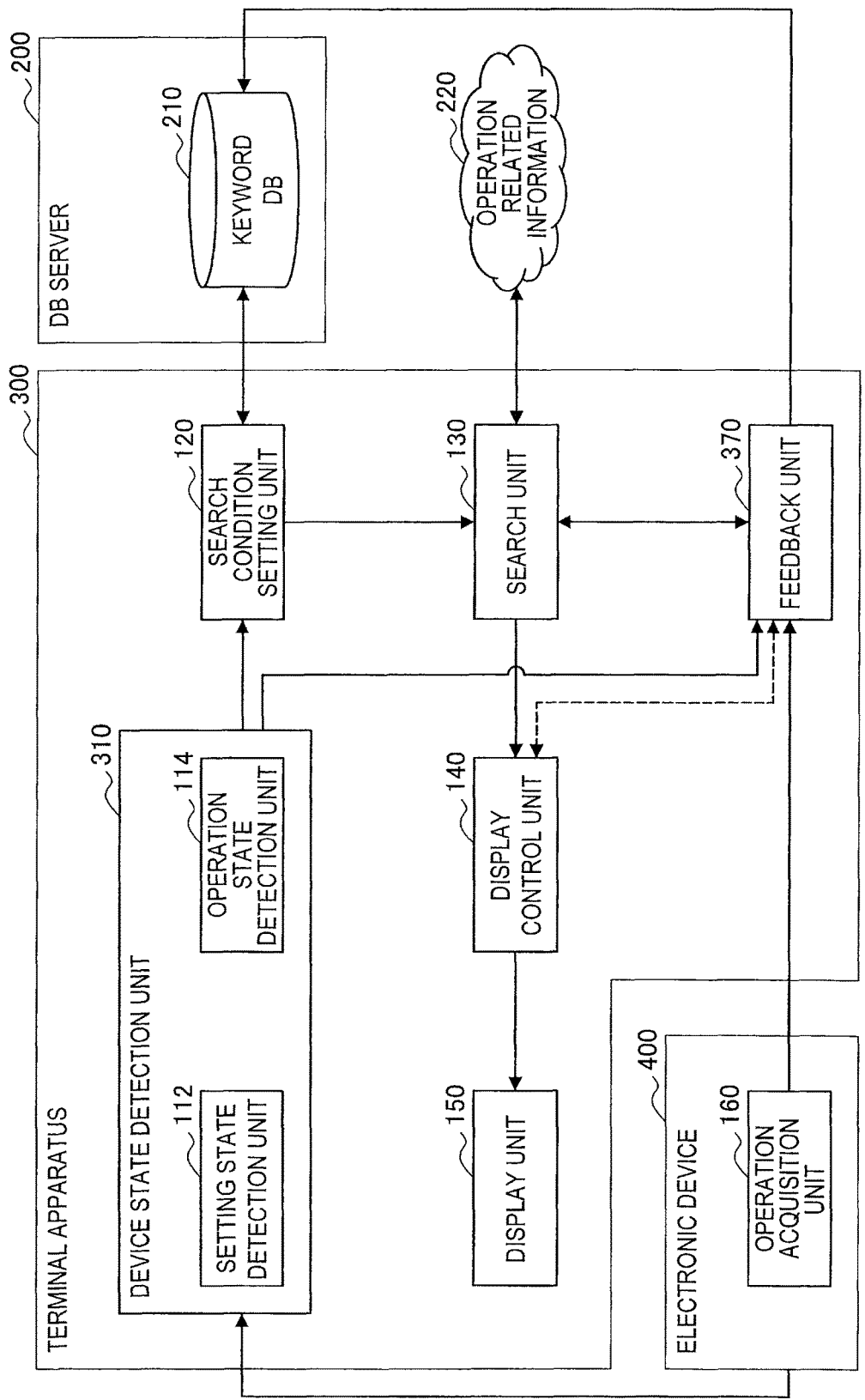
FIG. 7 is a block diagram schematically illustrating a functional configuration according to a second embodiment of the present disclosure.

FIG. 7 is a block diagram schematically illustrating a functional configuration according to a second embodiment of the present disclosure. With reference to FIG. 7, a terminal apparatus 300 according to the present embodiment includes a device state detection unit 310, a search condition setting unit 120, a search unit 130, a display control unit 140, a display unit 150, and a feedback unit 170. The terminal apparatus 300 can acquire information indicating a device state of an electronic device 400, and may be various devices capable of accessing a network to acquire operation related information. For example, the terminal apparatus 300 may be an information terminal such as a PC and a mobile phone (smartphone). Different from the electronic device 100 according to the first embodiment, the terminal apparatus 300 does not executes a function relative to operation related information. The electronic device 400 executes the function. The terminal apparatus 300 is used for reference to operation related information in substitution for the electronic device 400, which does not have a network communication function or a function of outputting information that is searched for. The electronic device 400 may be, for example, a home-use electrical appliance such as a television, a recorder, a game console, and a digital camera.

The figure illustrates at least one of functional configurations of the terminal apparatus 300, the electronic device 400, and a DB server 200 that is relative to the present embodiment. Such a functional configuration may be realized by a hardware configuration of an information processing apparatus, which will be described below, for example. The terminal apparatus 300, the electronic device 400, and the DB server 200 may each include a structural element that realizes the device original function such as a conversation function of a mobile phone and a broadcast content display function of a television, in addition to the illustrated structural elements. However, since such a functional configuration has been already known well to those skilled in the art, the detailed description will be omitted herein.

A configuration of each unit in the terminal apparatus 300 will be further described below. Additionally, the same structural elements as the structural elements described in the first embodiment are denoted with the same reference numerals, and repeated explanation of these structural elements is omitted.

The device state detection unit 310 includes at least one of a setting state detection unit 112 and an operation state detection unit 114, and detects a device state of the electronic device 400. The device state detection unit 310 may be configured differently from the device state detection unit 110 according to the first embodiment in order to detect the device state of the electronic device 400, which is a different apparatus from the terminal apparatus 300. For example, the device state detection unit 310 may receive, from the electronic device 400, information indicating the device state detected in the electronic device 400. In this case, the device state detection unit 310 may be realized by a communication apparatus that communicates with the electronic device 400 via a home LAN or the like. In this case, a device state detection unit (not shown) that detects a device state may be installed in the electronic device 400.

Alternatively, the device state detection unit 310 may detect the device state of the electronic device 400 by monitoring a network including the terminal apparatus 300 or capturing an image of the electronic device 400, for example. In this case, the device state detection unit 310 may be realized by a combination of a communication apparatus or an imaging apparatus with a processor such as a CPU. For example, when the electronic device 400 is connected to the network including the terminal apparatus 300, the device state detection unit 310 recognizes the terminal apparatus 300 and another device connected to the network as an external device connected to the electronic device 400. In addition, the device state detection unit 310 may detect a function activated in the electronic device 400 or the latest operation history by capturing an image of a display unit of the electronic device 400 such as an operation panel and analyzing displayed contents on the display unit.

The feedback unit 370 generates a feedback for a search condition on the basis of an operation input of a user, which is acquired by an operation acquisition unit 160 of the electronic device 400, the device state of the electronic device 400, which is detected by the device state detection unit 310, and/or a search result of operation related information 220, which is acquired by the search unit 130, and provides the feedback to the DB server 200 along with the device state used for setting the search condition or the function of the electronic device 400. Since the terminal apparatus 300 is a different apparatus from the electronic device 400 in the present embodiment, the feedback unit 370 acquires the operation input of a user, which is acquired by the operation acquisition unit 160 via the network such as the home LAN. The feedback unit 370 may be realized by a combination of a communication apparatus with a processor such as a CPU. Additionally, with respect to an operation input of the terminal apparatus 300 regarding reference to the search result, the feedback unit 370 may acquire information from an operation acquisition unit (not shown) of the terminal apparatus 300.

Even if the terminal apparatus indirectly acquires a device state of the electronic device and the electronic device, which is an operation target, does not search for operation related information nor reference a database, appropriate operation related information is easily acquired through the search in the above-described second embodiment.

3. Third Embodiment

Figure 8:
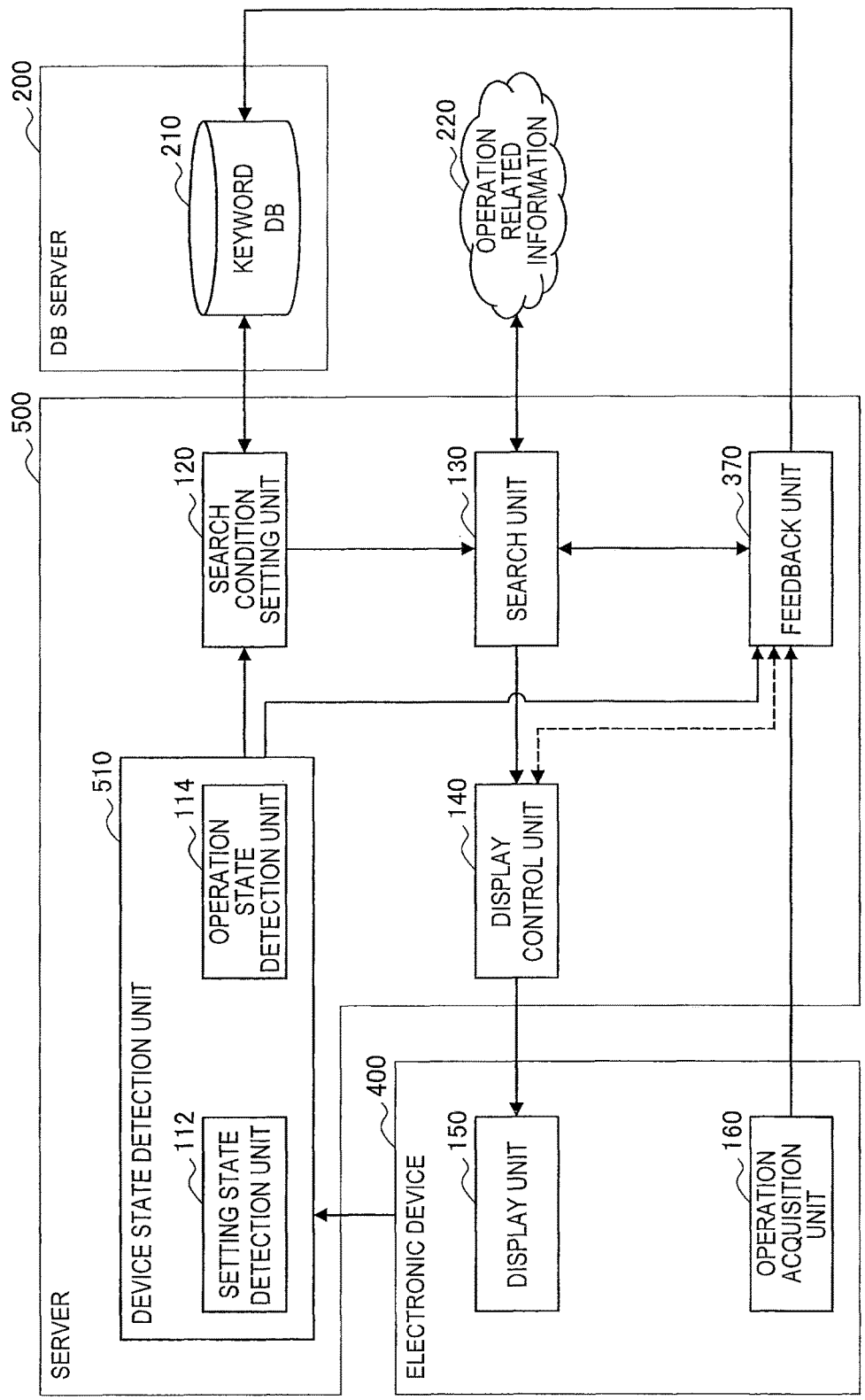
FIG. 8 is a block diagram schematically illustrating a functional configuration according to a third embodiment of the present disclosure.

FIG. 8 is a block diagram schematically illustrating a functional configuration according to a third embodiment of the present disclosure. With reference to FIG. 8, a server 500 according to the present embodiment includes a device state detection unit 510, a search condition setting unit 120, a search unit 130, a display control unit 140, and a feedback unit 370. The server 500 can receive information indicating a device state of an electronic device 400, access a network, search for operation related information, and transmit the search result to the electronic device 400. The server 500 is realized by a single or multiple server apparatuses on the network. Some of such server apparatuses may be common to server apparatuses that realize a DB server 200.

The figure illustrates at least one of functional configurations of the electronic device 400, the server 500, and the DB server 200 that is relative to the present embodiment. Such a functional configuration may be realized by a hardware configuration of an information processing apparatus, which will be described below, for example. The electronic device 400, the server 500, and the DB server 200 may each include a structural element that realizes the device original function such as a conversation function of a mobile phone and a broadcast content display function of a television, in addition to the illustrated structural elements. However, since such a functional configuration has been already known well to those skilled in the art, the detailed description will be omitted herein.

A configuration of each unit in the server 500 will be further described below. Additionally, the same structural elements as the structural elements described in the first and second embodiments are denoted with the same reference numerals, and repeated explanation of these structural elements is omitted.

The device state detection unit 510 includes at least one of a setting state detection unit 112 and an operation state detection unit 114, and detects a device state of the electronic device 400. For example, since the server 500 is on the network, the device state detection unit 510 receives, from the electronic device 400, information indicating the device state detected in the electronic device 400. In this case, the device state detection unit 510 may be realized by a communication apparatus that communicates with the electronic device 400 via the Internet or the like. In this case, a device state detection unit (not shown) that detects a device state may be installed in the electronic device 400.

Alternatively, the device state detection unit 510 may receive information indicating the device state of the electronic device 400 from an apparatus that indirectly detects the device state of the electronic device 400 in the same way as the terminal apparatus 300 according to the second embodiment. In this case, the device state detection unit 510 may be realized by a communication apparatus that communicates with the apparatus via the Internet or the like.

The server indirectly acquires the device state of the electronic device in the above-described third embodiment so that the server can perform processes such as a search for operation related information and reference to the database.

4. Fourth Embodiment

Figure 9:
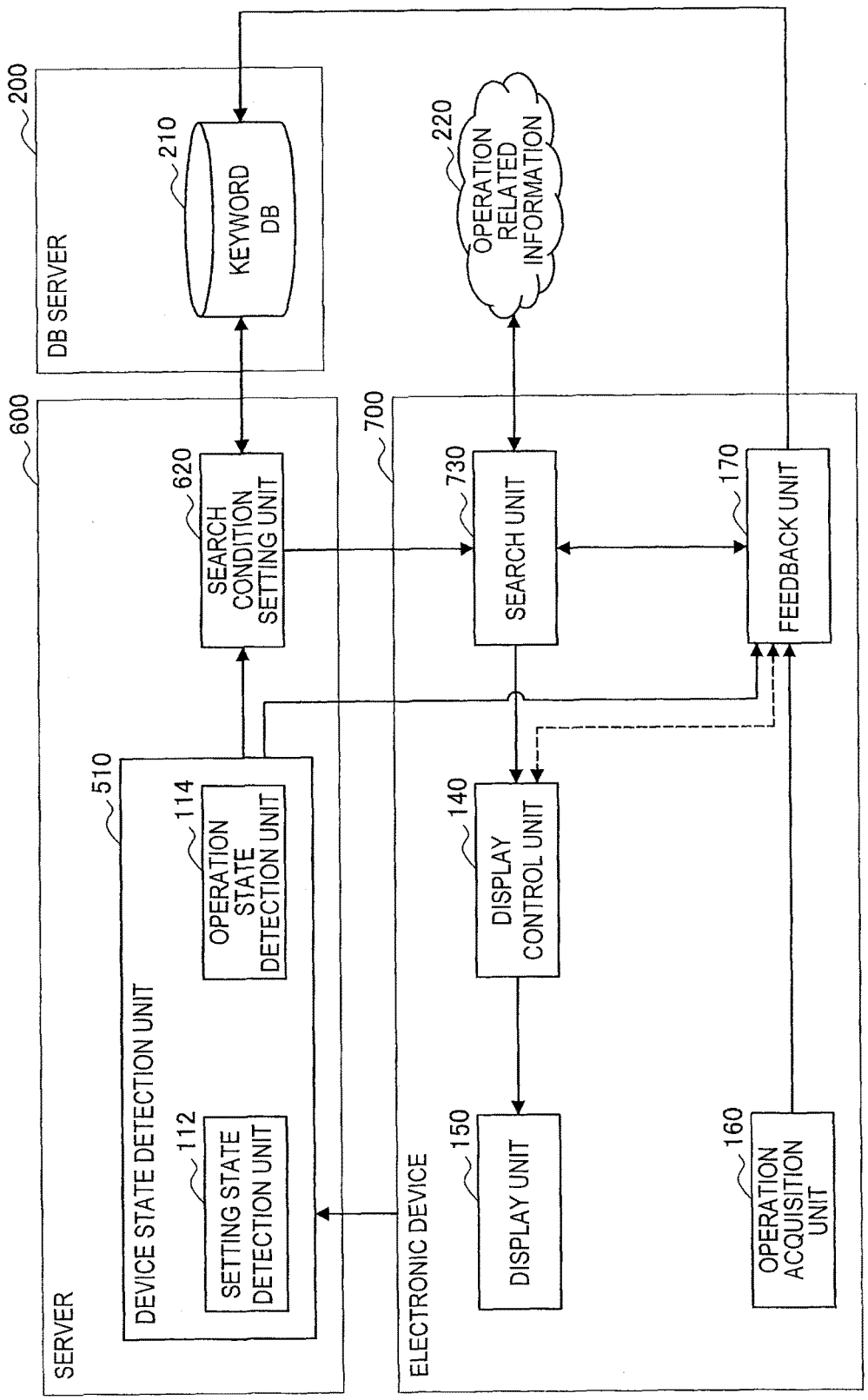
FIG. 9 is a block diagram schematically illustrating a functional configuration according to a fourth embodiment of the present disclosure.

FIG. 9 is a block diagram schematically illustrating a functional configuration according to a fourth embodiment of the present disclosure. With reference to FIG. 9, a server 600 according to the present embodiment includes a device state detection unit 510 and a search condition setting unit 620. An electronic device 700, which communicates with the server 600 via a network, includes a search unit 730, a display control unit 140, a display unit 150, an operation acquisition unit 160, and a feedback unit 170. The server 600 can receive information indicating a device state of the electronic device 700, set a search condition for searching for operation related information for the electronic device 700, and transmit the operation related information to the electronic device 700. The server 600 is realized by a single or multiple server apparatuses on the network. Some of such server apparatuses may be common to server apparatuses that realize a DB server 200.

The figure illustrates at least one of functional configurations of the server 600, the electronic device 700, and the DB server 200 that is relative to the present embodiment. Such a functional configuration may be realized by a hardware configuration of an information processing apparatus, which will be described below, for example. The server 600, the electronic device 700, and the DB server 200 may each include a structural element that realizes the device original function such as a conversation function of a mobile phone and a broadcast content display function of a television, in addition to the illustrated structural elements. However, since such a functional configuration has been already known well to those skilled in the art, the detailed description will be omitted herein.

A configuration of each unit in the server 600 and the electronic device 700 will be further described below. Additionally, the same structural elements as the structural elements described in the first to third embodiments are denoted with the same reference numerals, and repeated explanation of these structural elements is omitted.

The search condition setting unit 620 of the server 600 sets a search condition for a search for operation related information on the basis of a device state detected by the device state detection unit 510 in the same way as the search condition setting unit 120 according to the first embodiment. The search condition setting unit 620 also references a keyword DB 210 of the DB server 200. However, the search condition setting unit 620 does not internally provide the set search condition to the search unit, but transmits the set search condition to the electronic device 700 via the network. For example, a communication apparatus (not shown) included in the server 600 may transmit the search condition.

The search unit 730 of the electronic device 700 searches for operation related information in accordance with the search condition that is set by the search condition setting unit 620, in the same way as the search unit 130 according to the first embodiment. The search unit 730 also provides the search result to the display control unit 140. However, the search unit 730 does not internally acquire the search condition from the search condition setting unit, but receives the search condition from the server 600 via the network. For example, a communication apparatus (not shown) included in the electronic device 700 may receive the search condition.

A search condition is set in the server and a search is executed in the electronic device (or another terminal apparatus), separately, in the above-described fourth embodiment. For example, a known configuration can be adopted for a search after a search condition is set. Thus, according to the present embodiment, it is possible to acquire appropriate operation relative information through a search by using an (existing, for example) electronic device configured to search for operation related information with the known configuration, and adding a function of receiving a search condition from a server to the electronic device.

5. Hardware Configuration

Figure 10:
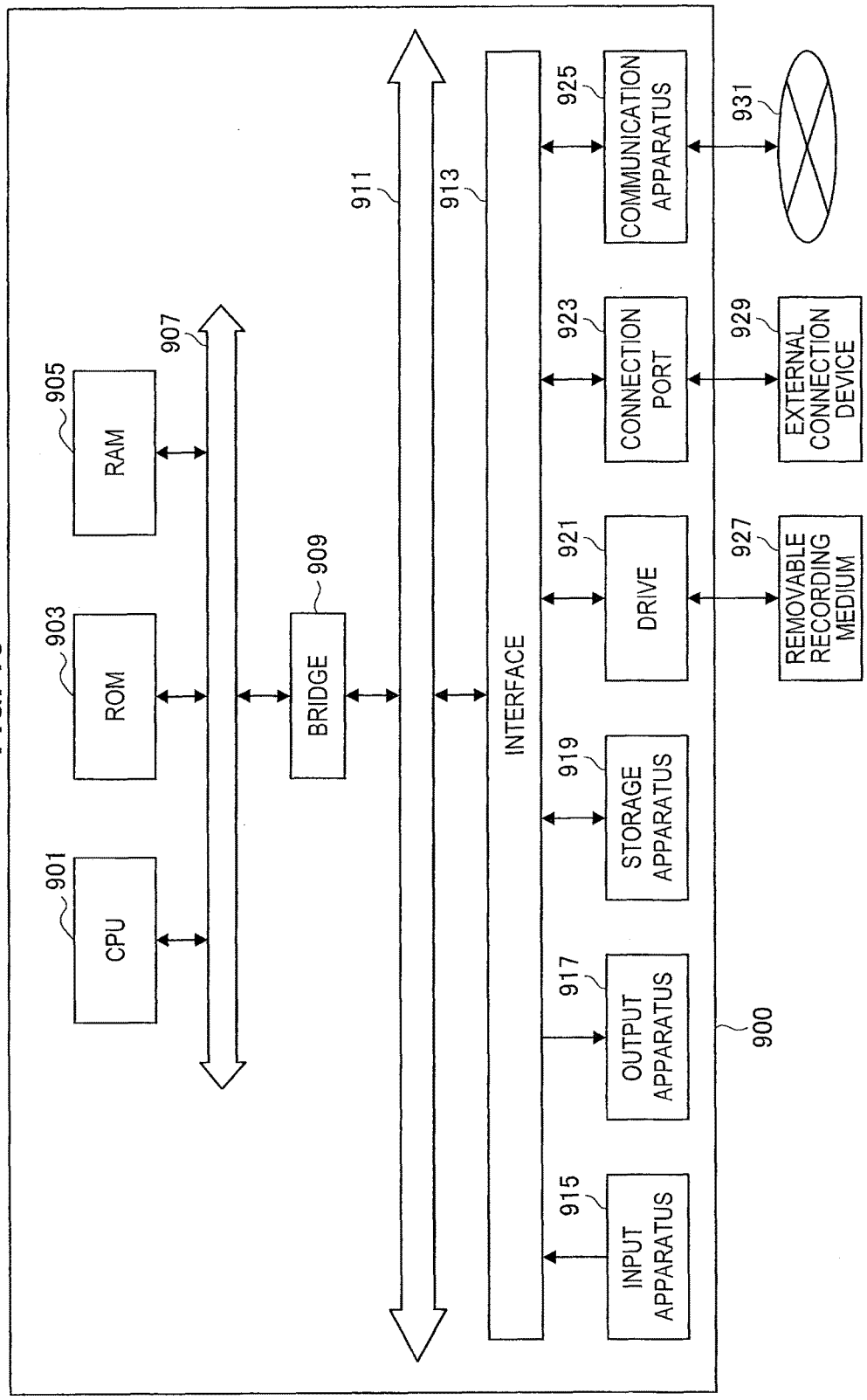
FIG. 10 is a block diagram for describing a hardware configuration of an information processing apparatus.

Next, with reference to FIG. 10, a hardware configuration of an information processing apparatus according to an embodiment of the present disclosure will be described. FIG. 10 is a block diagram for describing the hardware configuration of the information processing apparatus. An illustrated information processing apparatus 900 may realize, for example, the electronic device, the terminal apparatus, and the server apparatus according to the above-described embodiments.

The information processing apparatus 900 includes a central processing unit (CPU) 901, read only memory (ROM) 903, and random access memory (RAM) 905. The information processing apparatus 900 may also include a host bus 907, a bridge 909, an external bus 911, an interface 913, an input apparatus 915, an output apparatus 917, a storage apparatus 919, a drive 921, a connection port 923, and a communication apparatus 925. In substitution for or in addition to the CPU 901, the information processing apparatus 900 may include a processing circuit such as a digital signal processor (DSP).

The CPU 901 functions as an operation processing apparatus and a control apparatus, and controls a whole or a part of an operation in the information processing apparatus 900 in accordance with various programs recorded on the ROM 903, RAM 905, the storage apparatus 919, or a removable recording medium 927. The ROM 903 stores a program, an operation parameter, and the like that are used by the CPU 901. The RAM 905 primarily stores a program used when the CPU 901 is executed, a parameter that varies as appropriate upon the execution, and the like. The CPU 901, the ROM 903, and the RAM 905 are interconnected by the host bus 907, which includes an internal bus such as a CPU bus. Furthermore, the host bus 907 is connected to the external bus 911 such as a peripheral component interconnect/interface (PCI) bus via the bridge 909.

The input apparatus 915 is an apparatus such as a mouse, a keyboard, a touch panel, a button, a switch, and a lever that is operated by a user. The input apparatus 915 may be, for example, a remote control device using infrared radiation or other radio waves, or an external connection device 929 such as a mobile phone compatible with an operation of the information processing apparatus 900. The input apparatus 915 includes an input control circuit configured to generate an input signal on the basis of information that is input by a user and to output the input signal to the CPU 901. The user operates the input apparatus 915 to input various data or issue an instruction for a processing operation to the information processing apparatus 900.

The output apparatus 917 includes a device capable of visually or aurally notifying a user of acquired information. The output apparatus 917 may be a display apparatus such as a liquid crystal display (LCD), a plasma display panel (PDP), and an organic electro-luminescence (EL) display, an audio output apparatus such as a speaker and a headphone, and a printer. The output apparatus 917 outputs a result acquired through a process performed by the information processing apparatus 900, as video such as text and an image or a sound such as voice and an acoustic sound.

The storage apparatus 919 is a data storage apparatus, which is configured as an example of a storage unit in the information processing apparatus 900. The storage apparatus 919 includes, for example, a magnetic storage unit device such as a hard disk drive (HDD), a semiconductor storage device, an optical storage device, or a magneto-optical storage apparatus. The storage apparatus 919 stores various programs and data that are executed by the CPU 901 and various data that is externally acquired, for example.

The drive 921 is a reader/writer for the removable recording medium 927 such as a magnetic disk, an optical disc, a magneto-optical disk, and a semiconductor memory, and built in or attached to the information processing apparatus 900. The drive 921 reads out information recorded on the mounted removable recording medium 927, and outputs the information to the RAM 905. The drive 921 also writes record into the mounted removable recording medium 927.

The connection port 923 is used for direct connection of a device to the information processing apparatus 900. The connection port 923 may be, for example, a universal serial bus (USB) port, an IEEE1394 port, a small computer system interface (SCSI) port, and the like. The connection port 923 may also be an RS-232C port, an optical audio terminal, a high-definition multimedia interface (HDMI) port, and the like. The external connection device 929 is connected to the connection port 923 so that various data may be exchanged between the information processing apparatus 900 and the external connection device 929.

The communication apparatus 925 is a communication interface that includes, for example, a communication device for connection to a connection network 931. The communication apparatus 925 may be, for example, a communication card for a wired or wireless local area network (LAN), Bluetooth (registered trademark), or a wireless USB (WUSB). The communication apparatus 925 may also be an optical communication rooter, a rooter for an asymmetric digital subscriber line (ADSL), or a modem for various types of communication, for example. For example, the communication apparatus 925 transmits and receives a signal to and from the Internet or another communication device with a predetermined protocol such as the TCP/IP. The communication network 931 connected to the communication apparatus 925 is connected by use of a cable or wirelessly connected. The communication network 931 is, for example, the Internet, a home LAN, infrared communication, radio wave communication, satellite communication, or the like.

As above, the example of the hardware configuration of the information processing apparatus 900 has been described. Each structural element may include a general-purpose member, or hardware dedicated to the function of each structural element. The configuration may be changed as appropriate in accordance with a technical level at the time of implementing an embodiment of the present disclosure.

6. Supplement

The embodiments of the present disclosure may include, for example, an information processing apparatus (such as an electronic device, a terminal apparatus, and a server) as described above, a system, an information processing method executed in the information processing apparatus or the system, a program for causing the information processing apparatus to function, and a non-transitory tangible medium having the program recorded thereon.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
 a device state detection unit configured to detect a device state of an electronic device; and
 a search condition setting unit configured to reference a database that stores information regarding the device state in association with a search condition used for a search for operation related information for the electronic device, and to extract the search condition corresponding to the device state.

(2) The information processing apparatus according to (1), further including:
 a search unit configured to execute the search for the operation related information in accordance with the extracted search condition, and to acquire a search result; and
 an output control unit configured to cause the search result to be output.

(3) The information processing apparatus according to (2), further including:
 an operation acquisition unit configured to acquire an operation input to the electronic device after the search result is output; and
 a feedback unit configured to generate, based on the operation input, feedback information for the extracted search condition or the search result.

(4) The information processing apparatus according to (3), wherein the output control unit includes a display control unit that displays the operation related information on a list, the operation related information being included in the search result,
 wherein the operation acquisition unit acquires an operation input for displaying detailed operation related information by selecting one piece of the operation related information displayed on the list, and
 wherein the feedback unit generates the feedback information based on the operation input for displaying the detailed operation related information.

(5) The information processing apparatus according to (4), wherein, when the detailed operation related information is displayed, the feedback unit generates positive feedback information for the extracted search condition or the search result.

(6) The information processing apparatus according to any one of (3) to (5), wherein, when the search result is output and then an operation input according to the operation related information included in the search result is acquired, the feedback unit generates positive feedback information for the extracted search condition or the search result.

(7) The information processing apparatus according to any one of (2) to (6), wherein the device state detection unit further detects a device state of the electronic device after the search result is output, wherein, when the device state of the electronic device after the search result is output shows that a function relative to the operation related information included in the search result is realized, the information processing apparatus generates positive feedback information for the extracted search condition or the search result.

(8) The information processing apparatus according to any one of (2) to (7), further including:

a feedback unit configured to generate feedback information for the search result, wherein, when the output control unit displays the operation related information included in the search result on a list, the output control unit includes a display control unit that sets whether to display the operation related information on the list, or sets sort order of the list, based on feedback information for a previous search result.

(9) The information processing apparatus according to any one of (1) to (8), wherein the search condition setting unit estimates a desired function of the electronic device based on the device state, and references the database that stores the estimated function in association with the search condition.

(10) The information processing apparatus according to any one of (1) to (9), wherein the device state detection unit detects a setting state of the electronic device.

(11) The information processing apparatus according to (10), wherein the device state detection unit detects a format, a connected external device, or network connection setting of the electronic device.

(12) The information processing apparatus according to any one of (1) to (11), wherein the device state detection unit detects an operation state of the electronic device.

(13) The information processing apparatus according to (12), wherein the device state detection unit detects a use history, a storage unit capacity, an activated function, or an operation history of the electronic device.

(14) The information processing apparatus according to any one of (1) to (13), wherein the search condition setting unit references the database generated based on a result of a search executed by another user who uses an identical type of electronic device to the electronic device.

(15) The information processing apparatus according to (14), further including:

a feedback unit configured to generate feedback information for the search condition, and to reflect the feedback information in the database.

(16) The information processing apparatus according to (1), wherein the device state detection unit detects the device state based on information received from the electronic device, and wherein the search condition setting unit extracts the search condition that is transmitted to the electronic device.

(17) An information processing method including:

detecting a device state of an electronic device; and referencing a database that stores information regarding the device state in association with a search condition used for a search for operation related information for the electronic device, and extracting the search condition corresponding to the device state.

(18) A program for causing a computer to realize the functions of:

detecting a device state of an electronic device; and referencing a database that stores information regarding the device state in association with a search condition used for a search for operation related information for the electronic device, and extracting the search condition corresponding to the device state.

What is claimed is:

1. An information processing apparatus, comprising:
   one or more circuits, wherein the information processing apparatus is configured to couple to a first electronic device of a first user via a connection network, wherein the one or more circuits are configured to:
   detect a first device state of the first electronic device, wherein the first device state corresponds to at least a setting state of the first electronic device;
   reference a database that is configured to store at least the setting state of the first electronic device in association with a search condition used for a first search for operation related information about a desired function of the first electronic device; and
   extract the search condition to search for the operation related information about the desired function of the first electronic device based on at least the setting state of the first electronic device;
   execute the first search for the operation related information based on the extracted search condition to acquire a first search result;
   output the first search result, wherein the operation related information is included in the outputted first search result; and
   set display of the operation related information on one of a list on a display screen of the first electronic device of the first user or set sort order of the list based on a feedback information of a second search result of a second search executed by a second user.

2. The information processing apparatus according to claim 1, wherein the one or more circuits are further configured to:
   acquire an operation input to the first electronic device after the first search result is outputted; and
   generate a first feedback information for one of the extracted search condition or the outputted first search result based on the operation input.

3. The information processing apparatus according to claim 2, wherein the one or more circuits are further configured to:
   display the operation related information as the list on the display screen of the first electronic device;
   select at least one of the operation related information displayed on the list;
   acquire the operation input for display of detailed operation related information based on the selection of at least one of the operation related information; and
   generate a second feedback information based on the operation input for the display of the detailed operation related information.

4. The information processing apparatus according to claim 3, wherein the one or more circuits are further configured to generate a first positive feedback information for one of the extracted search condition or the outputted first search result based on the displayed detailed operation related information.

5. The information processing apparatus according to claim 4,
wherein the one or more circuits are further configured to:
store in the database, at least one search keyword provided with the first positive feedback information.

6. The information processing apparatus according to claim 2, wherein the one or more circuits are further configured to generate one of a first positive feedback information for the extracted search condition or the outputted first search result based on the outputted first search result and the operation input acquired after the outputted first search result.

7. The information processing apparatus according to claim 2, wherein the search condition comprises one of at least one search keyword or at least a part of a search query, and
wherein the one or more circuits are further configured to:
store in the database, the one of at least one search keyword or at least the part of the search query; and
evaluate a search keyword from the one of at least one search keyword or at least the part of the search query stored in the database based on the first feedback information.

8. The information processing apparatus according to claim 1, wherein the one or more circuits are configured to:
detect a second device state of the first electronic device after the first search result is output, and
generate a first positive feedback information for one of the extracted search condition or the outputted first search result based on the detected second device state of the first electronic device that shows represents recognition of a function relative to the operation related information that is included in the first search result.

9. The information processing apparatus according to claim 1, wherein the one or more circuits are further configured to:
generate a first feedback information for the outputted first search result; and
display the operation related information included in the first search result on the list based on the set display of the operation related information on one of the list or the set sort order of the list.

10. The information processing apparatus according to claim 1, wherein the one or more circuits are further configured to:
estimate the desired function of the first electronic device based on the first device state; and
reference the database that is configured to store the estimated desired function in association with the search condition.

11. The information processing apparatus according to claim 1, wherein the one or more circuits are further configured to:
detect at least the setting state of the first electronic device.

12. The information processing apparatus according to claim 1,
wherein the first device state further corresponds to an operation state of the first electronic device, and
wherein the one or more circuits are further configured to:
detect the operation state of the first electronic device.

13. The information processing apparatus according to claim 12,
wherein the operation state of the first electronic device corresponds to at least one of a use history, a storage unit capacity, an activated function or an operation history of the first electronic device.

14. The information processing apparatus according to claim 1, wherein the one or more circuits are further configured to:
reference the database generated based on the second search result of the second search executed by the second user who uses a second electronic device, that is similar to the first electronic device of the first user.

15. The information processing apparatus according to claim 14, wherein the one or more circuits are further configured to:
generate a first feedback information for the search condition, and
store the first feedback information in the database.

16. The information processing apparatus according to claim 1, wherein the one or more circuits are further configured to:
detect the first device state based on information received from the first electronic device; and
extract the search condition transmitted to the first electronic device.

17. The information processing apparatus according to claim 1, wherein at least the setting state of the first electronic device corresponds to a connection state of an external device with the first electronic device.

18. The information processing apparatus according to claim 1, wherein the one or more circuits are further configured to identify the desired function based on a frequency of selection of the desired function from a plurality of functions in the first electronic device by the first user of the first electronic device.

19. The information processing apparatus according to claim 1,
wherein at least the setting state of the first electronic device corresponds to at least one of a format of the first electronic device, a connected external device, or a network connection setting associated with the first electronic device that remains unchanged until changed by the first user associated with the first electronic device.

20. An information processing method, comprising:
detecting, by one or more circuits of an information processing apparatus, a device state of an electronic device of a first user, wherein the device state corresponds to at least a setting state of the electronic device;
referencing, by the one or more circuits, a database that is configured to store at least the setting state of the electronic device in association with a search condition used for a first search for operation related information about a desired function of the electronic device; and
extracting, by the one or more circuits, the search condition for searching the operation related information about the desired function of the electronic device based on at least the setting state of the electronic device;
executing, by the one or more circuits, the first search for the operation related information based on the extracted search condition to acquire a first search result;
outputting, by the one or more circuits, the first search result, wherein the operation related information is included in the outputted first search result; and setting, by the one or more circuits, display of the operation related information on one of a list on a display screen of the electronic device of the first user or set sort order of the list, based on a feedback information of a second search result of a second search executed by a second user.

21. A non-transitory computer-readable storage medium of an information processing apparatus configured to couple to an electronic device of a first user via a connection network, having stored thereon, computer-executable instructions for causing a computer to execute operations, the operations comprising:

detecting a device state of the electronic device, wherein the device state corresponds to at least a setting state of the electronic device;

referencing a database that is configured to store at least the setting state of the electronic device in association with a search condition used for a first search for operation related information about a desired function of the electronic device; and extracting the search condition for searching the operation related information about the desired function of the electronic device based on at least the setting state of the electronic device;

executing the first search for the operation related information based on the extracted search condition to acquire a first search result;

outputting the first search result, wherein the operation related information is included in the outputted first search result; and setting display of the operation related information on one of a list on a display screen of the electronic device of the first user or set sort order of the list, based on a feedback information of a second search result of a second search executed by a second user.

\* \* \* \* \*